Jan. 29, 1963

A. L. AMENT ET AL 3,075,776

SIDE DELIVERY MANURE SPREADER

Filed Aug. 5, 1960

Alphons L. Ament
Paul P. Rupp
INVENTORS

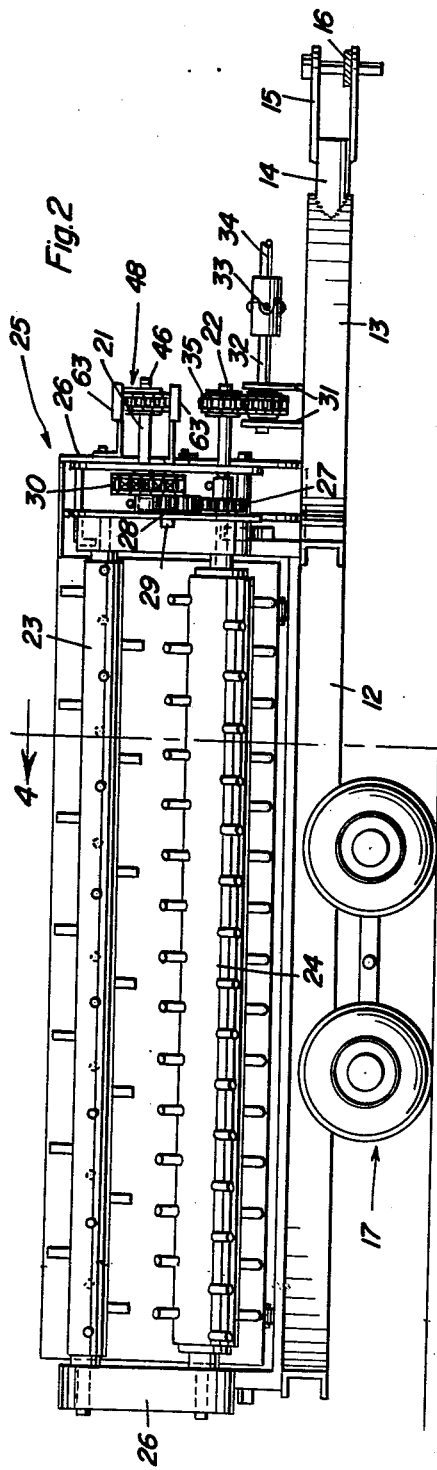

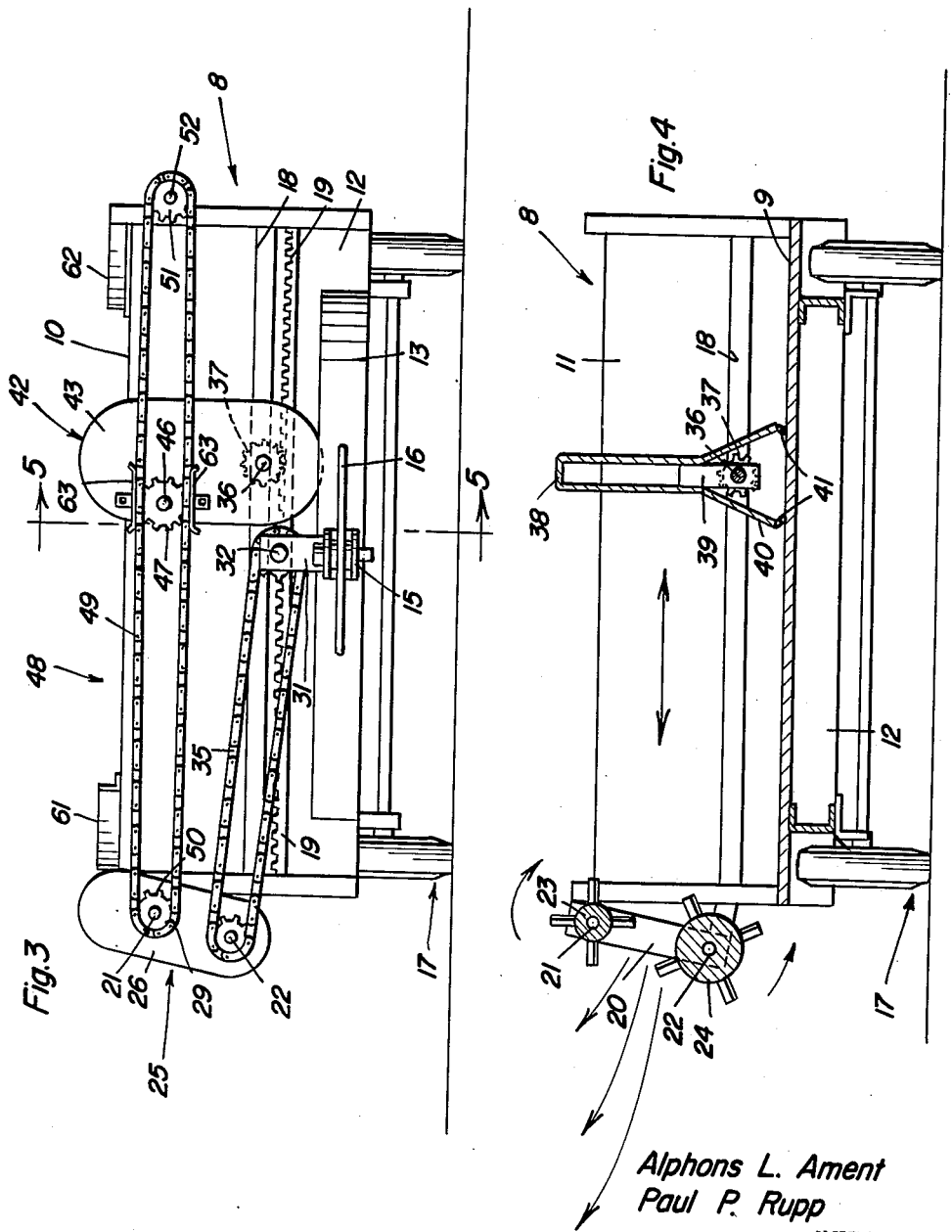

United States Patent Office 3,075,776
Patented Jan. 29, 1963

3,075,776
SIDE DELIVERY MANURE SPREADER
Alphons L. Ament, 119 S. 7th St., and Paul P. Rupp, 106 E. Spruce St., both of Cherokee, Iowa
Filed Aug. 5, 1960, Ser. No. 47,739
3 Claims. (Cl. 275—4)

This invention relates to new and useful improvements in manure spreaders particularly of the tractor drawn type and has for its primary object to provide, in a manner as hereinafter set forth, a machine of this character which is adapted to more evenly spread manure without excessive compression thereof on one side of said machine.

Another very important object of the present invention is to provide, in a side delivery spreader of the aforementioned character comprising a pair of coacting, oppositely rotating spiked scattering rollers operative to more widely distribute material and novel power actuated means for feeding the manure by a feeding blade to said rollers in a continuous manner and automatically reversible for more rapid retraction of the feed blade.

Still another important object of the invention is to provide a side delivery manure spreader of the character described wherein the feed means is geared to the scattering rollers for continuous operation in unison therewith.

Other objects of the invention are to provide a manure spreader of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an elevational view of the machine, looking at the discharge side thereof;

FIGURE 3 is a front elevational view;

FIGURE 4 is a view in transverse section through the machine, taken substantially on the line 4—4 of FIGURE 2;

FIGURE 5 is a fragmentary view in vertical longitudinal section on an enlarged scale through the front end portion of the machine, taken substantially on the line 5—5 of FIGURE 3;

FIGURE 6 is a vertical sectional view through the feeder actuating transmission, taken substantially on the line 6—6 of FIGURE 5; and FIGURE 7 is an elevational view of the upper portion of the feeder actuating transmission, showing same set to move the feeder toward the scattering rollers.

Figure 1:
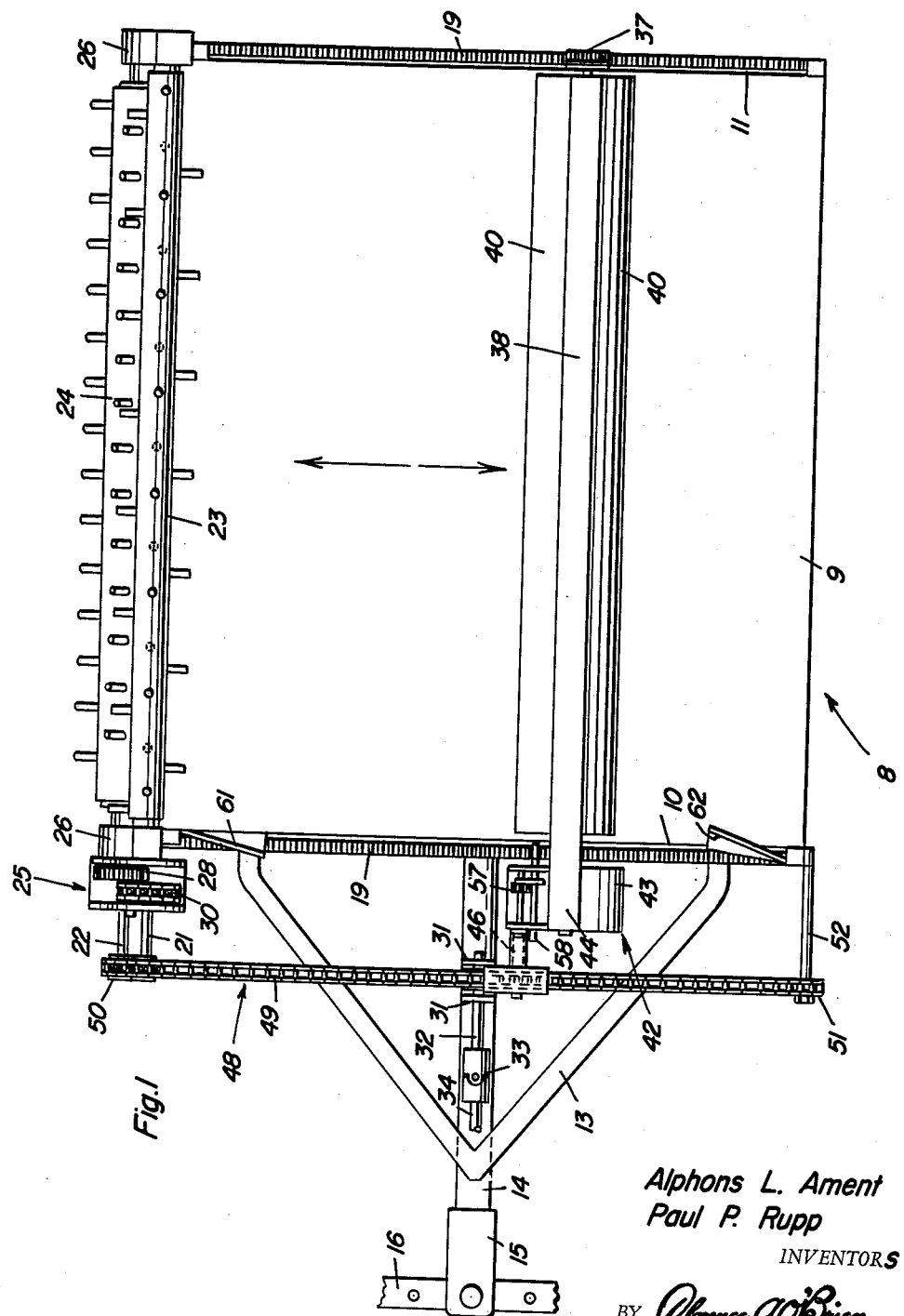
FIGURE 1 is a view in top plan of a side delivery manure spreader constructed in accordance with the present invention.

Referring now to the drawing in detail, it will be seen that the embodiment of the invention which has been illustrated comprises a substantially rectangular body of suitable dimensions and material which is designated generally by reference numeral 8. The body 8 which is for the reception of the manure to be spread, is open at its top and on both sides, said body including a bottom 9 and front and rear end walls 10 and 11, respectively.

The body 8 is mounted on a frame 12 comprising a generally V-shaped forward end portion 13 having mounted therein a longitudinal tubular tongue 14. The tongue 14 projects forwardly beyond the apex of the front portion 13 of the frame 12 and has mounted thereon a suitable hitch 15 for connecting the machine to the usual drawbar of a tractor, as indicated at 16. Rockably mounted beneath the frame 12 at an intermediate point is a tandem wheel truck 17.

The front and rear walls 10 and 11 of the body 8 have formed in their lower portions slots 18. Mounted on the outer sides of the body walls 10 and 11, below the slots 18 and parallel thereto, are racks 19. The purpose of the slots 18 and the racks 19 will be presently set forth.

Journaled in suitable supports 20 which are provided therefor on one of the open side portions of the body 8 is a pair of spaced, parallel, longitudinally extending upper and lower shafts 21 and 22, respectively. A spiked upper scattering roller 23 is fixed on the shaft 21. A substantially similar but diametrically larger scattering roller 24 is fixed on the lower shaft 22 for coaction with the upper roller 23 to empel particulate material over the larger roller 24 without compression thereof between said rollers for which reason the roller 23 is smaller in diameter and completely spaced in a vertical direction above the lower roller 24.

A transmission 25 operatively connects the shafts 21 and 22 for rotation in opposite directions as indicated by the arrows in FIGURE 4 of the drawing the shaft 21 being rotated slowly as compared to shaft 22. The transmission 25 includes a housing or the like 26 through which the forward end portions of the shafts 21 and 22 extend. Fixed on the shaft 22 in the housing 26 is a pinion gear 27 as seen in FIGURE 2. The gear 27 meshes with a relatively large gear 28 necessarily driven thereby at a lower speed in the opposite direction to shaft 22, the gear 28 being mounted on a shaft 29 in an intermediate portion of the housing 26 between the shafts 21 and 22. A chain and sprocket drive 30 operatively connects the gear 28 to the shaft 21 for rotation thereof in said opposite direction and at said lower speed. Journaled in suitable bearings 31 which are provided therefor on the tongue 14 adjacent the front wall 10 of the body 8 is a longitudinal shaft 32. The shaft 32 is operatively connected in any suitable manner, as indicated at 33, to a drive shaft 34 from the usual power take-off of the tractor. A chain and sprocket drive 35 operatively connects the shaft 32 to the shaft 22. Thus, the scattering rollers 23 and 24 are driven in opposite directions to unload material passing therebetween with the peripheral speed of the spikes on the lower roller 24 being greater than that of the upper roller 23 to discharge the material in a lateral direction and upwardly as shown by the arrows in FIGURE 4, for wider distribution and scattering.

A longitudinal shaft 36 is operable in the slots 18, the end portions of said shaft projecting beyond the front and rear walls 10 and 11, respectively, of the body 8 and having fixed thereon pinion gears 37 which travel on the racks 19. Mounted longitudinally on the shaft 36 for lateral movement therewith in the body 8 is a generally inverted U-shaped follower blade assembly 38. In the embodiment shown, the follower 38 has mounted therein suitable bearings 39 (see FIGURE 4) in which the shaft 36 is journaled. The opposed walls of the follower 38 comprise divergent lower portions 40 having mounted therebeneath suitable rollers 41 which travel on the bottom or floor 9 of the body 8.

The follower feed blade 38 is movable toward and away from the scattering rollers 23 and 24. Toward this end, a reversible continuous drive transmission 42 is provided and disposed forwardly of the front wall 10 for protection against clogging by material loaded and unloaded from the side portions of the spreader rearwardly of the front wall 10. The transmission 42 includes a housing or the like 43 which depends from a forwardly projecting arm 44 on the upper or bight portion of the follower 38. As best seen in FIGURE 5 of the drawing, the shaft 36 extends through the housing 43 and has fixed thereon a gear 45 which is operable in said housing. Also journaled in the housing 43 and projecting forwardly therefrom is a drive shaft 46. The shaft 46 has fixed on its forward end portion a sprocket gear 47. A chain and sprocket drive 48 operatively connects the shaft 21 of the transmission 25 to the transmission 42 for drive thereof in timed relation to the scattering rollers. As shown in FIGURE 3 of the drawing, the drive 48 also protectively extends forwardly of the front wall 10 in a lateral direction and includes an endless chain 49 both of the runs or flights of which are engaged with the gear 47, said chain 49 being trained over a drive sprocket 50 on the shaft 21 and an idle sprocket 51 which is journaled on a suitable supporting shaft 52 provided therefor on the side of the body 8 which is remote from the rollers 23 and 24. The transmission 42 further includes a train of speed reduction and reversing gears 53, 54, 55 and 56 to the gear 45. Splined on the shaft 46 and operable in the housing 43 is a reversing gear 57 which is selectively engageable with the gear 53 to propel the transmission housing 43 and follower 38 connected thereto slowly toward the scattering rollers as compared to a more rapid speed when the gear 57 meshes with the gear 55 to propel the housing 43 away from the scattering rollers, as will be apparent to those familiar with kinematics of gearing. Reference character 58 designates a shifting rod which is slidable in the housing 43 and which parallels the shaft 46. A fork 59 operatively connects the rod 58 to the gear 57. The rod 58 terminates in a downturned inner or rear end portion 60 which is engageable with cams or the like 61 and 62 on the end portions of the front body wall 10 for automatically reversing the direction of travel of the feed follower 38.

It is thought that the operation of the machine will be readily apparent from a consideration of the foregoing. Briefly, with the follower 38 in the side portion of the body 8 which is remote from the scattering rollers 23 and 24, the manure to be spread is deposited in said body. As the machine is pulled forwardly by the tractor and with the transmission 42 in the position of FIGURE 7 of the drawing, the follower 38 is moved slowly toward the spiked, coacting, oppositely rotating scattering rollers 23 and 24 for feeding the manure thereto in an obvious manner. As indicated by certain of the arrows in FIGURE 4 of the drawing, the manure is thrown laterally from one side of the machine between the scattering rollers 23 and 24. As the follower 38 approaches the scattering rollers and the body 8 has been emptied or substantially so, the end portion 60 of the rod 58 engages the cam 61 and is actuated inwardly or rearwardly thereby for reversing the transmission 42 by disengaging the gear 57 from the gear 53 and engaging said gear 57 with the gear 55. When this occurs the follower 38 is retracted at a rapid speed to the reloading side portion of the body 8 which is remote from the scattering rollers 23 and 24 and the machine is ready to be reloaded. Also, since the follower 38 is driven in both directions by a positive and continuous type drive 42 continuously in driving connection with the scattering rollers by means of drive 48, any overloading of the scattering rollers will stop operation of the follower blade 38 and vice versa to prevent compression of material and uneven spreading thereof. While the machine is particularly adapted for spreading manure, it has also been found highly satisfactory as a feed bunk filler. Guides or guards 63 retain the chain 49 in engagement with the sprocket gear 47.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A manure spreader comprising a wheel supported body open at its top for the reception of manure and including an open side, said body further including opposed front and rear walls having horizontal slots therein, racks fixed on said front and rear body walls respectively forwardly and rearwardly thereof and adjacent to and paralleling the slots, a pair of coacting scattering rollers operable in the open side portion of the body, means for actuating one of the rollers, means operatively connecting the other of said rollers to said one roller for actuation thereby in unison therewith, a follower operable in the body for feeding the manure to the rollers, a shaft journaled on said follower and operable in the slots, pinions fixed on the end portions of said shaft and operable on the racks for support and movement of the follower on the front and rear walls, and means comprising a reversing transmission operatively connecting said other of said rollers to said shaft for moving the follower toward and away from said rollers.

2. A vehicle mounted spreader comprising body means adapted to hold material for spreading, scattering means movably mounted on the body means in spaced relation to a loading portion for rapid discharge of said material from the body means, material feeding means mounted in the body means for feeding movement from said loading portion to said scattering means and positive drive means operatively connected to the scattering means and feeding means for imparting continuous movement thereto and automatically reversing and changing speed of movement of the feeding means only in response to approach thereof respectively toward the loading portion and the scattering means, said positive drive means including movable gear means drivingly interconnecting the scattering means and the feeding means, fixed gear means mounted on the body means and operative to support and effect movement of the feeding means relative to the body means, reversible gear means mounted on the feeding means and drivingly connected to the movable gear means and fixed gear means for movement of the feeding means in a selected direction and speed, and cam means fixedly mounted on the body means adjacent said scattering means and loading portion for operative engagement with the reversible gear means to select direction and speed of movement of the feeding means.

3. The combination of claim 2 wherein said scattering means includes a pair of vertically spaced scattering rollers driven in opposite directions and at different speeds for discharge of the material between vertically spaced peripheral portions of the rollers in an outward and upward direction, an upper one of said rollers being of a smaller diameter to avoid compression of material between said peripheral portions.

References Cited in the file of this patent

UNITED STATES PATENTS

| | | |
|---|---|---|
| 309,987 | Smith | Dec. 30, 1884 |
| 419,463 | Merrell | Jan. 14, 1890 |
| 773,332 | Merrell | Oct. 25, 1904 |
| 947,374 | Cook | Jan. 25, 1910 |
| 1,120,021 | Burton | Dec. 8, 1914 |
| 2,263,748 | Webb et al. | Nov. 25, 1941 |
| 2,303,583 | Sallee | Dec. 1, 1942 |
| 2,758,841 | Larsson | Aug. 14, 1956 |

OTHER REFERENCES

Gebruder Streif: German application 1,001,037, printed January 17, 1957 (Klasse 45B 6/01).